T. COLVIN.
STEAM-PACKING.
No. 183,252.             Patented Oct. 17, 1876.
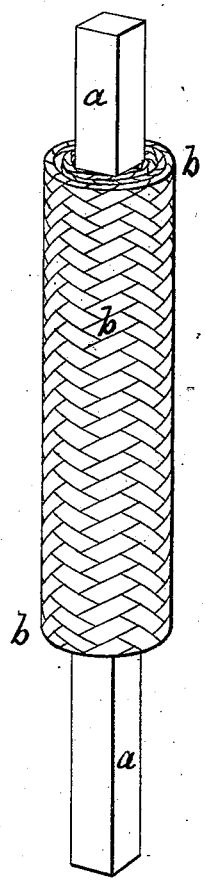
WITNESSES.
James M. Dodge
Wm Kemble Hall
Thomas Colvin
INVENTOR.

UNITED STATES PATENT OFFICE.

THOMAS COLVIN, OF NEW YORK, N. Y.

IMPROVEMENT IN STEAM-PACKING.

Specification forming part of Letters Patent No. 183,252, dated October 17, 1876; application filed March 11, 1876.

*To all whom it may concern:*

Be it known that I, THOMAS COLVIN, of New York, in the county and State of New York, have invented a certain new and useful Improvement in Steam-Packing, of which the following is a specification:

The said invention relates to packing for stuffing-boxes and other similar purposes, which has hitherto been made of india-rubber wrapped with canvas, so that a small core of the material, which is the more expensive, has been sufficient to furnish elasticity to the entire thickness of the packing; but the canvas covering has interfered with its flexibility, and it has therefore been difficult to apply thick packing around small rods, for instance, as conveniently and effectively as could be done with a plaited gasket, in which the strands are laid and interwoven diagonally, and the same want of flexibility has interfered with the tightness of the joints where the ends of the pieces of packing that form the separate layers are butted together.

The object of my improvement is to combine the advantages of the india-rubber with a plait the strands of which are impregnated by powdered plumbago; and it consists in making the packing with an india-rubber core of small size, and with a covering of hempen strands laid up to the required size or diameter by an ordinary braiding-machine. In their passage through the machine the strands of hemp or other fibrous material that may be substituted for it may be impregnated with plumbago or other anti-friction material or composition.

To enable others skilled in the arts to which it appertains to make and use my invention, I will proceed to describe its construction and operation with reference to the drawing, which represents a short piece of packing made according to my said improvement, and with a portion of the covering removed at the ends to show its structure.

The india-rubber core $a$ may be made of any other elastic material that is suitable for the purpose. It is convenient to cut it in square strips from a sheet, but it may be round or of any other section.

The covering is of strands $b$, that have been passed through powdered plumbago and braided around the core by an ordinary braiding-machine. The diagonal strands, interlaced throughout the entire thickness of the covering, or laid in separate layers, enable it to be sharply bent without creasing, and the small core of india-rubber is large enough to give it the requisite elasticity. The combined elasticity and flexibility, which are so desirable for the purposes to which packing is applied, is due to the combination of the india-rubber core and the braided covering I have described; and its value for the purpose intended is further enhanced by the powdered plumbago with which it is combined. As grease or any similar matter that may be used as a lubricator will injure the india-rubber when subjected to heat, I do not use any such material; and I disclaim also the separate use of the plumbago, or of the braided strands or the india-rubber core.

I claim as my invention—

The new article of manufacture composed of india-rubber, fibrous braids, and plumbago, combined in the manner and for the purpose described.

THOMAS COLVIN.

Witnesses:
  JAMES M. DODGE,
  WM. KEMBLE HALL.